(12) United States Patent  
Hsieh et al.

(10) Patent No.: US 9,956,801 B2
(45) Date of Patent: May 1, 2018

(54) PRINTING PLATES DOPED WITH RELEASE OIL

(75) Inventors: Bing Hsieh, Pleasanton, CA (US); Timothy D. Stowe, Alameda, CA (US); Santokh S. Badesha, Pittsford, NY (US); Chu-heng Liu, Penfield, NY (US); Mandakini Kanungo, Penfield, NY (US); Jorge A. Alvarez, Webster, NY (US); Patrick J. Howe, Fairport, NY (US); Matthew M. Kelly, West Henrietta, NY (US); David J. Gervasi, Pittsford, NY (US); Palghat Srinivas Ramesh, Pittsford, NY (US)

(73) Assignees: Xerox Corporation, Norwalk, CT (US); Palo Alto Research Center Incorporated, Palo Alto, CA (US)

( * ) Notice: Subject to any disclaimer, the term of this patent is extended or adjusted under 35 U.S.C. 154(b) by 504 days.

(21) Appl. No.: 13/601,840

(22) Filed: Aug. 31, 2012

(65) Prior Publication Data

US 2014/0060358 A1 Mar. 6, 2014

(51) Int. Cl.
*B41M 5/00* (2006.01)
*B41M 1/06* (2006.01)
*B41M 5/50* (2006.01)
*B41N 3/08* (2006.01)
*C08K 5/549* (2006.01)

(52) U.S. Cl.
CPC .............. *B41M 1/06* (2013.01); *B41M 5/502* (2013.01); *B41N 3/08* (2013.01); *B41P 2227/70* (2013.01); *C08K 5/549* (2013.01)

(58) Field of Classification Search
CPC .......... B41M 1/06; B41M 5/502; B41N 3/08; C08K 5/549
See application file for complete search history.

(56) References Cited

U.S. PATENT DOCUMENTS

| | | |
|---|---|---|
| 3,741,118 A | 6/1973 | Carley |
| 3,800,699 A | 4/1974 | Carley |
| 3,877,372 A | 4/1975 | Leeds |
| 4,627,349 A | 12/1986 | Claussen |
| 4,887,528 A | 12/1989 | Ruge et al. |
| 5,067,404 A | 11/1991 | Frunder et al. |
| 5,366,772 A * | 11/1994 | Badesha .............. C08G 77/442 428/35.8 |
| 5,701,815 A | 12/1997 | Bocko et al. |

(Continued)

FOREIGN PATENT DOCUMENTS

| | | |
|---|---|---|
| DE | 101 60 734 A1 | 7/2002 |
| DE | 103 60 108 A1 | 10/2004 |

(Continued)

OTHER PUBLICATIONS

European Search Report in corresponding related application EP 11 187 196.8 dated Mar. 30, 2012.

(Continued)

*Primary Examiner* — Alison L Hindenlang
*Assistant Examiner* — Michael Robinson
(74) *Attorney, Agent, or Firm* — Caesar Rivise, PC

(57) ABSTRACT

An imaging member surface contains a swellable elastomer doped with a release oil. This aids in complete transfer of ink to a receiving substrate when a thin film of release oil forms upon the surface during application of pressure at the nip.

11 Claims, 2 Drawing Sheets

Step A

Step B

Step C

(56) References Cited

U.S. PATENT DOCUMENTS

| | | | |
|---|---|---|---|
| 5,763,129 A * | 6/1998 | Chen | G03G 15/2053 |
| | | | 399/328 |
| 5,855,173 A | 1/1999 | Chatterjee et al. | |
| 6,125,756 A | 10/2000 | Nüssel et al. | |
| 6,146,798 A | 11/2000 | Bringans et al. | |
| 6,261,688 B1 * | 7/2001 | Kaplan | C09D 183/08 |
| | | | 428/372 |
| 6,318,264 B1 | 11/2001 | D'Heureuse et al. | |
| 6,725,777 B2 | 4/2004 | Katano | |
| 6,841,366 B1 | 1/2005 | Bower et al. | |
| 7,020,355 B2 | 3/2006 | Lahann et al. | |
| 7,061,513 B2 | 6/2006 | Katano et al. | |
| 7,100,503 B2 | 9/2006 | Wiedemer et al. | |
| 7,191,705 B2 | 3/2007 | Berg et al. | |
| 8,347,787 B1 | 1/2013 | Stowe et al. | |
| 8,919,252 B2 * | 12/2014 | Lestrange et al. | 101/478 |
| 8,943,961 B2 * | 2/2015 | Vella et al. | 101/132.5 |
| 2003/0167950 A1 | 9/2003 | Mori | |
| 2004/0011234 A1 | 1/2004 | Figov et al. | |
| 2005/0178281 A1 | 8/2005 | Berg et al. | |
| 2005/0258136 A1 | 11/2005 | Kawanishi et al. | |
| 2006/0152566 A1 | 7/2006 | Taniuchi et al. | |
| 2007/0199457 A1 | 8/2007 | Cyman, Jr. et al. | |
| 2007/0199458 A1 | 8/2007 | Cyman, Jr. et al. | |
| 2007/0199459 A1 | 8/2007 | Cyman, Jr. et al. | |
| 2007/0199460 A1 | 8/2007 | Cyman, Jr. et al. | |
| 2007/0199461 A1 | 8/2007 | Cyman, Jr. et al. | |
| 2007/0199462 A1 | 8/2007 | Cyman, Jr. et al. | |
| 2008/0011177 A1 | 1/2008 | Muraoka | |
| 2008/0032072 A1 | 2/2008 | Taniuchi et al. | |
| 2008/0223240 A1 | 9/2008 | Drury et al. | |
| 2010/0031838 A1 | 2/2010 | Lewis et al. | |
| 2012/0103212 A1 | 5/2012 | Stowe et al. | |
| 2012/0103213 A1 | 5/2012 | Stowe et al. | |
| 2012/0103214 A1 | 5/2012 | Stowe et al. | |
| 2012/0103217 A1 | 5/2012 | Stowe et al. | |
| 2012/0103218 A1 | 5/2012 | Stowe et al. | |
| 2012/0103219 A1 | 5/2012 | Stowe et al. | |
| 2012/0103221 A1 | 5/2012 | Stowe et al. | |
| 2012/0274914 A1 | 11/2012 | Stowe et al. | |
| 2013/0032050 A1 | 2/2013 | Pattekar et al. | |
| 2013/0033686 A1 | 2/2013 | Stowe et al. | |
| 2013/0033687 A1 | 2/2013 | Stowe et al. | |
| 2013/0033688 A1 | 2/2013 | Stowe et al. | |

FOREIGN PATENT DOCUMENTS

| | | |
|---|---|---|
| DE | 10 2006 050744 A1 | 4/2008 |
| DE | 10 2008 062741 A1 | 7/2010 |
| EP | 1 935 640 A2 | 6/2008 |
| EP | 1 938 987 A2 | 7/2008 |
| EP | 1 964 678 A2 | 9/2008 |
| JP | 06-082213 B * | 12/1987 |
| JP | 2009184275 A * | 8/2009 |
| WO | 2006/133024 A2 | 12/2006 |
| WO | 2009/025821 A1 | 2/2009 |

OTHER PUBLICATIONS

European Search Report in corresponding related application EP 11 187 195.0 dated Mar. 28, 2012.
European Search Report in corresponding related application EP 11 187 193.5 dated Feb. 29, 2012.
European Search Report in corresponding related application EP 11 187 192.7 dated Feb. 28, 2012.
European Search Report in corresponding related application EP 11 187 191.9 dated Mar. 1, 2012.
European Search Report in corresponding related application EP 11 187 190.1 dated Mar. 12, 2012.
European Search Report in corresponding related application EP 11 187 189.3 dated Feb. 28, 2012.
Shen et al., "A new understanding on the mechanism of fountain solution in the prevention of ink transfer to the non-image area in conventional offset lithography", J. Adhesion Sci. Technol., vol. 18, No. 15-16, pp. 1861-1887 (2004).
Katano et al., "The New Printing System Using the Materials of Reversible Change of Wettability", International Congress of Imaging Science 2002, Tokyo, pp. 297 et seq. (2002).
Biegelsen, U.S. Appl. No. 13/366,947, filed Feb. 6, 2012.
Liu et al., U.S. Appl. No. 13/426,209, filed Mar. 21, 2012.
Liu et al., U.S. Appl. No. 13/426,262, filed Mar. 21, 2012.
Lestrange et al., U.S. Appl. No. 13/601,803, filed Aug. 31, 2012.
Hsieh, U.S. Appl. No. 13/601,817, filed Aug. 31, 2012.
Kelly et al., U.S. Appl. No. 13/601,854, filed Aug. 31, 2012.
Liu, U.S. Appl. No. 13/601,876, filed Aug. 31, 2012.
Kanungo et al., U.S. Appl. No. 13/601,892, filed Aug. 31, 2012.
Moorlag et al., U.S. Appl. No 13/601,905, filed Aug. 31, 2012.
Gervasi et al., U.S. Appl. No. 13/601,920, filed Aug. 31, 2012.
Gervasi et al., U.S. Appl. No. 13/601,938, filed Aug. 31, 2012.
Gervasi et al., U.S. Appl. No. 13/601,956, filed Aug. 31, 2012.
Kanungo et al., U.S. Appl. No. 13/601,962, filed Aug. 31, 2012.

* cited by examiner

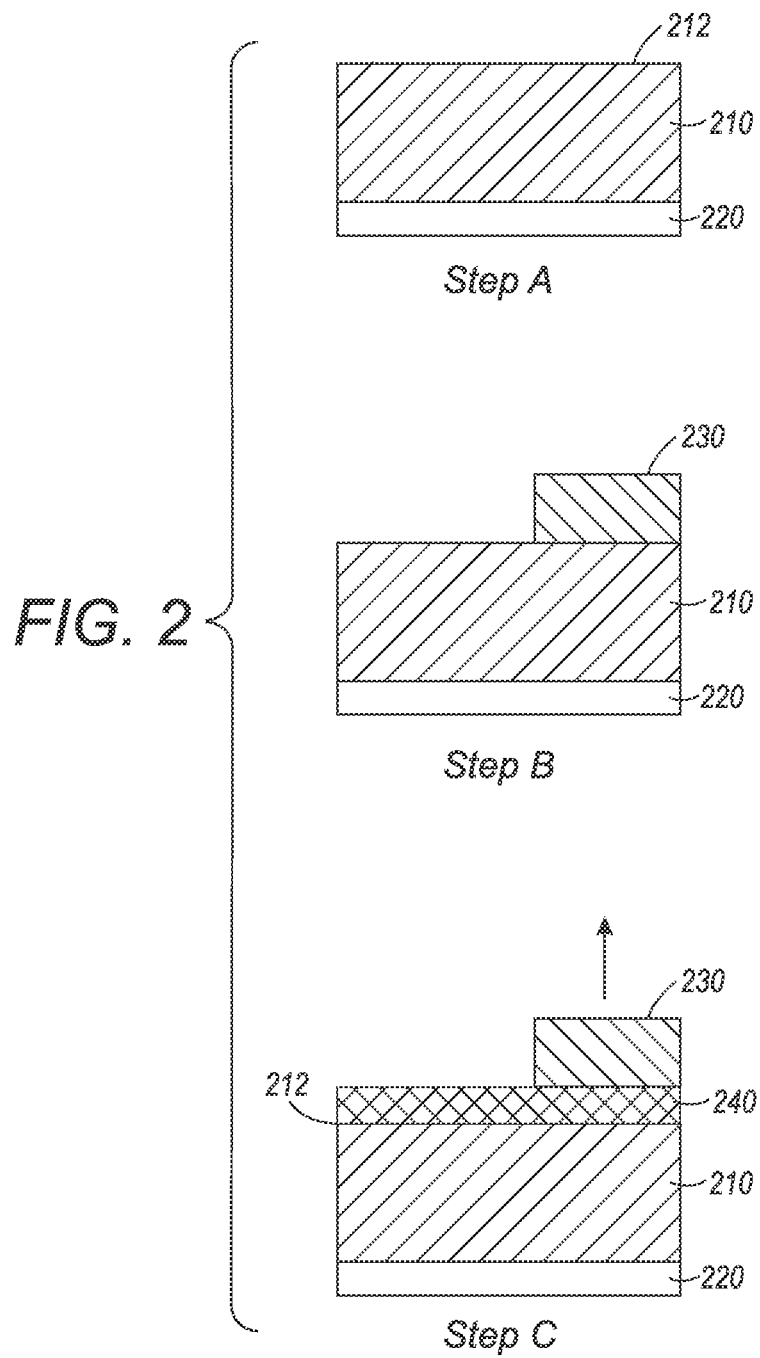

PRINTING PLATES DOPED WITH RELEASE OIL

This application is related to U.S. patent application Ser. No. 13/095,714, filed on Apr. 27, 2011, titled "Variable Data Lithography System," the disclosure of which is incorporated herein by reference in its entirety. This application is also related to co-pending U.S. patent application Ser. No. 13/601,962, titled "Imaging Member for Offset Printing Applications"; co-pending U.S. patent application Ser. No. 13/601,956, titled "Imaging Member for Offset Printing Applications"; co-pending U.S. patent application Ser. No. 13/601,938, titled "Imaging Member for Offset Printing Applications"; co-pending U.S. patent application Ser. No. 13/601,920, titled "Imaging Member for Offset Printing Applications"; co-pending U.S. patent application Ser. No. 13/601,905, titled "Textured Imaging Member"; co-pending U.S. patent application Ser. No. 13/601,876, titled "Variable Lithographic Printing Process"; co-pending U.S. patent application Ser. No. 13/601,892, titled "Imaging Member for Offset Printing Applications"; co-pending U.S. patent application Ser. No. 13/601,854, titled "Imaging Member for Offset Printing Applications"; co-pending U.S. patent application Ser. No. 13/601,817, titled "Imaging Member"; and co-pending U.S. patent application Ser. No. 13/601,803, titled "Methods and Systems for Ink-Based Digital Printing With Multi-Component, Multi-Functional Fountain Solution," all filed Aug. 31, 2012, the disclosures of which are incorporated herein by reference in their entirety.

BACKGROUND

Field of Disclosure

The present disclosure is related to imaging members having a surface layer as described herein. The imaging members are suitable for use in various marking and printing methods and systems, such as offset printing. The present disclosure permits methods and systems providing control of conditions local to the point of writing data to a reimageable surface in variable data lithographic systems. Methods of making and using such imaging members are also disclosed.

Background

Offset lithography is a common method of printing today. (For the purposes hereof, the terms "printing" and "marking" are interchangeable.) In a typical lithographic process a printing plate, which may be a flat plate, the surface of a cylinder, or belt, etc., is formed to have "image regions" formed of a hydrophobic/oleophilic material, and "non-image regions" formed of a hydrophilic/oleophobic material. The image regions correspond to the areas on the final print (i.e., the target substrate) that are occupied by a printing or marking material such as ink, whereas the non-image regions correspond to the areas on the final print that are not occupied by said marking material. The hydrophilic regions accept and are readily wetted by a water-based fluid, commonly referred to as a dampening fluid or fountain fluid (typically consisting of water and a small amount of alcohol as well as other additives and/or surfactants to reduce surface tension). The hydrophobic regions repel dampening fluid and accept ink, whereas the dampening fluid formed over the hydrophilic regions forms a fluid "release layer" for rejecting ink. The hydrophilic regions of the printing plate thus correspond to unprinted areas, or "non-image areas", of the final print.

The ink may be transferred directly to a target substrate, such as paper, or may be applied to an intermediate surface, such as an offset (or blanket) cylinder in an offset printing system. The offset cylinder is covered with a conformable coating or sleeve with a surface that can conform to the texture of the target substrate, which may have surface peak-to-valley depth somewhat greater than the surface peak-to-valley depth of the imaging plate. Also, the surface roughness of the offset blanket cylinder helps to deliver a more uniform layer of printing material to the target substrate free of defects such as mottle. Sufficient pressure is used to transfer the image from the offset cylinder to the target substrate. Pinching the target substrate between the offset cylinder and an impression cylinder provides this pressure.

Typical lithographic and offset printing techniques utilize plates which are permanently patterned, and are therefore useful only when printing a large number of copies of the same image (i.e. long print runs), such as magazines, newspapers, and the like. However, they do not permit creating and printing a new pattern from one page to the next without removing and replacing the print cylinder and/or the imaging plate (i.e., the technique cannot accommodate true high speed variable data printing wherein the image changes from impression to impression, for example, as in the case of digital printing systems). Furthermore, the cost of the permanently patterned imaging plates or cylinders is amortized over the number of copies. The cost per printed copy is therefore higher for shorter print runs of the same image than for longer print runs of the same image, as opposed to prints from digital printing systems.

Accordingly, a lithographic technique, referred to as variable data lithography, has been developed which uses a non-patterned reimageable surface that is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned reimageable surface. Ink applied thereover is retained in the pockets formed by the removal of the dampening fluid. The inked surface is then brought into contact with a substrate, and the ink transfers from the pockets in the dampening fluid layer to the substrate. The dampening fluid may then be removed, a new uniform layer of dampening fluid applied to the reimageable surface, and the process repeated.

It would be desirable to identify alternate materials that are suitable for use for imaging members in variable data lithography.

BRIEF DESCRIPTION

The present disclosure relates to imaging members for digital offset printing applications. The imaging members have a surface layer made of a swellable elastomer that is doped with a release oil.

Disclosed in some embodiments is an imaging member comprising a surface layer, the surface layer comprising a swellable elastomer doped with a release oil.

The release oil may have a viscosity of 200 centipoise or less and has a boiling point of 150° C. or greater. The release oil may be hexamethylcyclotrisiloxane (D3), octamethylcyclotetrasiloxane (D4), decamethylcyclopentasiloxane (D5), dodecamethylcyclohexasiloxane (D6), 1,3,5-tris[(3,3,3-trifluoropropyl)methyl]cyclotrisiloxane (D3F), or 1,3,5,7-tetrakis(3,3,3-trifluoropropyl)-1,3,5,7-tetramethylcyclotetrasiloxane (D4F).

The release oil may be a silicone oil, an organic oil, or a mineral oil and have a viscosity of 1000 centipoise or less.

The release oil may be from 1 to 20 weight percent of the surface layer.

The elastomer can be a silicone, a fluorosilicone, a nitrile rubber, fluoroelastomer, epichlorhydrin, a polyurethane rubber, or a polyisoprene.

In some embodiments, the elastomer is a silicone and the release oil is hexamethylcyclotrisiloxane (D3), octamethylcyclotetrasiloxane (D4), decamethylcyclopentasiloxane (D5), or dodecamethylcyclohexasiloxane (D6).

In other embodiments, the elastomer is a fluorosilicone and the release oil is 1,3,5-tris[(3,3,3-trifluoropropyl)methyl]cyclotrisiloxane (D3F) or 1,3,5,7-tetrakis(3,3,3-trifluoropropyl)-1,3,5,7-tetramethylcyclotetrasiloxane (D4F).

Also disclosed is a process of variable lithographic printing, comprising: developing a latent image on an imaging member by applying an ink composition to an imaging member surface, the imaging member comprising a surface layer, the surface layer comprising a swellable elastomer doped with a release oil; and transferring the developed image to a receiving substrate with an application of nip pressure, wherein the nip pressure results in a layer of the release oil being formed between the imaging member surface and the developed image to enhance transfer efficiency.

The transfer of the developed image may occur at about room temperature.

The process may further comprise: applying a fountain solution to the imaging member surface; and forming a latent image by evaporating the fountain solution at selective locations to form hydrophobic non-image areas and hydrophilic image areas.

Also disclosed in embodiments is a method of making an imaging member surface layer, comprising: depositing a surface layer composition upon a mold, the composition comprising a swellable elastomer; curing the surface layer composition; and doping the swellable elastomer with a release oil.

The swellable elastomer may be doped with the release oil prior to curing the surface layer composition. Alternatively, the surface layer composition is cured and the swellable elastomer is subsequently doped with the release oil.

These and other non-limiting aspects and/or objects of the disclosure are more particularly described below.

BRIEF DESCRIPTION OF THE DRAWINGS

The following is a brief description of the drawings, which are presented for the purposes of illustrating the exemplary embodiments disclosed herein and not for the purposes of limiting the same.

FIG. 2 is a schematic illustrating the workings of an exemplary imaging member of the present disclosure.

DETAILED DESCRIPTION

Figure 1:
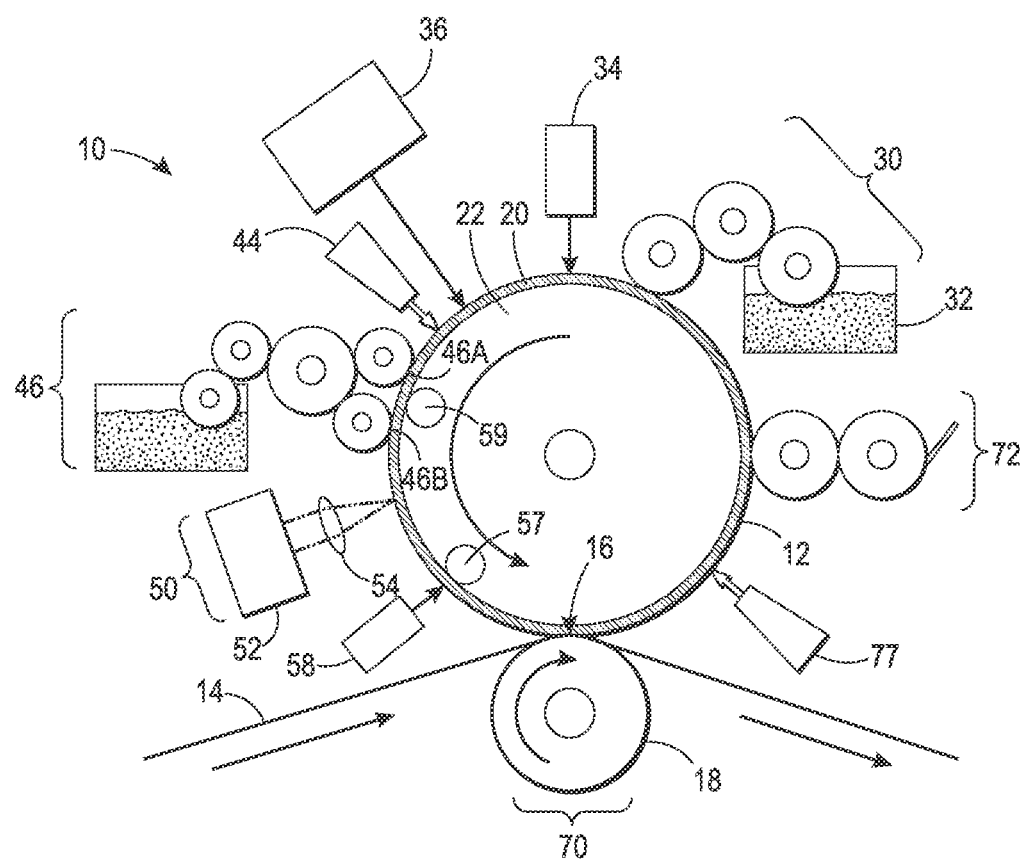
FIG. 1 illustrates a variable lithographic printing apparatus in which the imaging members of the present disclosure may be used.

A more complete understanding of the processes and apparatuses disclosed herein can be obtained by reference to the accompanying drawings. These figures are merely schematic representations based on convenience and the ease of demonstrating the existing art and/or the present development, and are, therefore, not intended to indicate relative size and dimensions of the assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The modifier "about" used in connection with a quantity is inclusive of the stated value and has the meaning dictated by the context (for example, it includes at least the degree of error associated with the measurement of the particular quantity). When used with a specific value, it should also be considered as disclosing that value. For example, the term "about 2" also discloses the value "2" and the range "from about 2 to about 4" also discloses the range "from 2 to 4."

The term "room temperature" refers to about 23° C. to about 25° C.

FIG. 1 illustrates a system for variable lithography in which the ink compositions of the present disclosure may be used. The system 10 comprises an imaging member 12. The imaging member comprises a substrate 22 and a reimageable surface layer 20. The surface layer is the outermost layer of the imaging member, i.e. the layer of the imaging member furthest from the substrate. As shown here, the substrate 22 is in the shape of a cylinder; however, the substrate may also be in a belt form, etc. Note that the surface layer is usually a different material compared to the substrate, as they serve different functions.

In the depicted embodiment the imaging member 12 rotates counterclockwise and starts with a clean surface. Disposed at a first location is a dampening fluid subsystem 30, which uniformly wets the surface with dampening fluid 32 to form a layer having a uniform and controlled thickness. Ideally the dampening fluid layer is between about 0.15 micrometers and about 1.0 micrometers in thickness, is uniform, and is without pinholes. As explained further below, the composition of the dampening fluid aids in leveling and layer thickness uniformity. A sensor 34, such as an in-situ non-contact laser gloss sensor or laser contrast sensor, is used to confirm the uniformity of the layer. Such a sensor can be used to automate the dampening fluid subsystem 30.

At optical patterning subsystem 36, the dampening fluid layer is exposed to an energy source (e.g. a laser) that selectively applies energy to portions of the layer to imagewise evaporate the dampening fluid and create a latent "negative" of the ink image that is desired to be printed on the receiving substrate. Image areas are created where ink is desired, and non-image areas are created where the dampening fluid remains. An optional air knife 44 is also shown here to control airflow over the surface layer 20 for the purpose of maintaining clean dry air supply, a controlled air temperature, and reducing dust contamination prior to inking. Next, an ink composition is applied to the imaging member using inker subsystem 46. Inker subsystem 46 may consist of a "keyless" system using an anilox roller to meter an offset ink composition onto one or more forming rollers 46A, 46B. The ink composition is applied to the image areas to form an ink image.

A rheology control subsystem 50 partially cures or tacks the ink image. This curing source may be, for example, an ultraviolet light emitting diode (UV-LED) 52, which can be focused as desired using optics 54. Another way of increasing the cohesion and viscosity employs cooling of the ink composition. This could be done, for example, by blowing cool air over the reimageable surface from jet 58 after the ink composition has been applied but before the ink composition is transferred to the final substrate. Alternatively, a heating element 59 could be used near the inker subsystem 46 to maintain a first temperature and a cooling element 57 could be used to maintain a cooler second temperature near the nip 16.

The ink image is then transferred to the target or receiving substrate 14 at transfer subsystem 70. This is accomplished by passing a recording medium or receiving substrate 14, such as paper, through the nip 16 between the impression roller 18 and the imaging member 12.

Finally, the imaging member should be cleaned of any residual ink or dampening fluid. Most of this residue can be easily removed quickly using an air knife 77 with sufficient air flow. Removal of any remaining ink can be accomplished at cleaning subsystem 72.

The imaging member surface generally has a tailored topology. Put another way the surface has a micro-roughened surface structure to help retain fountain solution/dampening fluid in the non-image areas. These hillocks and pits that make up the surface enhance the static or dynamic surface energy forces that attract the fountain solution to the surface. This reduces the tendency of the fountain solution to be forced away from the surface by roller nip action. The imaging member plays multiple roles in the variable data lithography printing process, which include: (1) wetting with the fountain solution, (2) creation of the latent image, (3) inking with the offset ink, and (4) enabling the ink to lift off and be transferred to the receiving substrate. Some desirable qualities for the imaging member, particularly its surface, include high tensile strength to increase the useful service lifetime of the imaging member. The surface layer should also weakly adhere to the ink, yet be wettable with the ink, to promote both uniform inking of image areas and to promote subsequent transfer of the ink from the surface to the receiving substrate.

The imaging members of the present disclosure include a surface layer that meets these requirements. The surface layer 20 of the present disclosure includes a swellable elastomer and is doped with a release oil.

The elastomer may generally be any thermoset or thermoplastic polymer which has high elasticity. Exemplary elastomers which may be useful in the present disclosure include silicones, fluorosilicones, fluoroelastomers, nitrile rubbers, epichlorhydrins, polyurethane rubbers, and polyisoprenes.

The term "silicone" is well understood in the arts and refers to polyorganosiloxanes having a backbone formed from silicon and oxygen atoms and sidechains containing carbon and hydrogen atoms. For the purposes of this application, the term "silicone" should also be understood to exclude siloxanes that contain fluorine atoms. Other functional groups may be present in the silicone rubber, for example vinyl, nitrogen-containing, mercapto, hydride, and silanol groups, which are used to link siloxane chains together during crosslinking. The sidechains of the polyorganosiloxane can be alkyl or aryl.

The term "alkyl" as used herein refers to a radical which is composed entirely of carbon atoms and hydrogen atoms which is fully saturated. The alkyl radical may be linear, branched, or cyclic. Linear alkyl radicals generally have the formula —$C_nH_{2n+1}$.

The term "aryl" refers to an aromatic radical composed entirely of carbon atoms and hydrogen atoms. When aryl is described in connection with a numerical range of carbon atoms, it should not be construed as including substituted aromatic radicals. For example, the phrase "aryl containing from 6 to 10 carbon atoms" should be construed as referring to a phenyl group (6 carbon atoms) or a naphthyl group (10 carbon atoms) only, and should not be construed as including a methylphenyl group (7 carbon atoms).

The term "fluorosilicone" as used herein refers to polyorganosiloxanes having a backbone formed from silicon and oxygen atoms and sidechains containing carbon, hydrogen, and fluorine atoms. At least one fluorine atom is present in the sidechain. The sidechains can be linear, branched, cyclic, or aromatic. The fluorosilicone may also contain functional groups, such as amino groups, which permit addition crosslinking. When the crosslinking is complete, such groups become part of the backbone of the overall fluorosilicone. Fluorosilicones are commercially available, for example CF1-3510 from NuSil.

The term "fluoroelastomer" refers to a copolymer that contains monomers exclusively selected from the group consisting of hexafluoropropylene (HFP), tetrafluoroethylene (TFE), vinylidene fluoride (VDF), perfluoromethyl vinyl ether (PMVE), and ethylene (ET). The term copolymer here refers to polymers made from two or more monomers. Fluoroelastomers usually contain two or three of these monomers, and have a fluorine content of from about 60 wt % to about 70 wt %. Put another way, a fluoroelastomer has the structure of Formula (1):

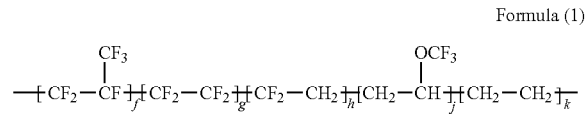

Formula (1)

where f is the mole percentage of HFP, g is the mole percentage of TFE, h is the mole percentage of VDF, j is the mole percentage of PMVE, and k is the mole percentage of ET; f+g+h+j+k is 100 mole percent; f, g, h, j, and k can individually be zero, but f+g+h+j must be at least 50 mole percent. Please note that Formula (1) only shows the structure of each monomer and their relative amounts, and should not be construed as describing the bonds within the fluoroelastomer (i.e. not as having five blocks). Fluoroelastomers generally have superior chemical resistance and good physical properties. Exemplary fluoroelastomers include those offered under the name VITON by DuPont.

The elastomer used to form the surface layer is swellable. The term "swellable" is used to refer to the fact that the release oil can diffuse into or be absorbed by the elastomer. The elastomer is not structurally damaged by this swelling behavior, and the release oil can be released by application of pressure upon the elastomer.

The elastomer can accept the deposition of ink (inking) and also release the ink onto a receiving substrate (deinking).

Desirably, the elastomer is solution or dispersion coatable, which permits easy fabrication of the surface layer. The elastomer may also be crosslinkable, to provide physical strength and chemical resistance. The elastomer may also be a fluoroelastomer-silicone composite, as described in related application Ser. No. 13/601,920, which is filed concurrently and titled "IMAGING MEMBER FOR OFFSET PRINTING APPLICATIONS". The elastomer may also be a fluoroelastomer-fluorosilicone composite, as described in related application Ser. No. 13/601,938, which is filed concurrently and titled "IMAGING MEMBER FOR OFF- SET PRINTING APPLICATIONS". The entireties of these two applications are hereby fully incorporated by reference herein.

The swellable elastomer is doped with a release oil. The release oil may be a silicone oil, an organic oil, or a mineral oil. A silicone oil is generally a polysiloxane with organic sidechains and having a low degree of polymerization, usually n=1200 or less. Organic oils are produced in remarkable diversity by plants, animals, and other organisms through natural metabolic processes. They have a high carbon and hydrogen content and are considerably lacking in oxygen compared to other organic compounds and minerals; they tend to be relatively nonpolar molecules, but may include both polar and nonpolar regions as in the case of phospholipids and steroids. A mineral oil is any of various colorless, odorless, light mixtures of alkanes in the $C_{15}$ to $C_{40}$ range from a non-vegetable (mineral) source, particularly a distillate of petroleum. The release oil has a viscosity of about 1000 centipoise or less.

Exemplary silicone oils include linear siloxanes having the structure of Formula (2):

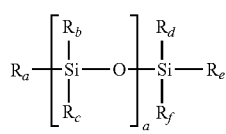

Formula (2)

wherein $R_a$, $R_b$, $R_c$, $R_d$, $R_e$, and $R_f$ are each independently hydrogen, alkyl, fluoroalkyl, or perfluoroalkyl; and a is an integer from 1 to about 5. In some specific embodiments, $R_a$, $R_b$, $R_c$, $R_d$, $R_e$, and $R_f$ are all alkyl. In more specific embodiments, they are all alkyl of the same length (i.e. same number of carbon atoms such as methyl and ethyl groups).

In this regard, the term "fluoroalkyl" as used herein refers to a radical which is composed entirely of carbon atoms and hydrogen atoms, in which one or more hydrogen atoms may be (i.e. are not necessarily) substituted with a fluorine atom, and which is fully saturated. The fluoroalkyl radical may be linear, branched, or cyclic. It should be noted that an alkyl group is a subset of fluoroalkyl groups. Some exemplary fluoroalkyl oils are commercially available from Halocarbon Products Corporation.

The term "perfluoroalkyl" as used herein refers to a radical which is composed entirely of carbon atoms and fluorine atoms which is fully saturated and of the formula —$C_nF_{2n+1}$. The perfluoroalkyl radical may be linear, branched, or cyclic. It should be noted that a perfluoroalkyl group is a subset of fluoroalkyl groups, and cannot be considered an alkyl group.

Exemplary compounds of Formula (2) include hexamethyldisiloxane and octamethyltrisiloxane, which are illustrated below as Formulas (2-a) and (2-b):

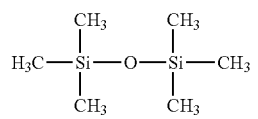

Formula (2-a)

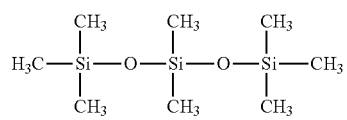

Formula (2-b)

Other exemplary silicone oils include cyclosiloxanes having the structure of Formula (3):

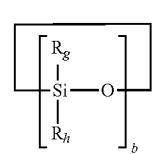

Formula (3)

wherein each $R_g$ and $R_h$ is independently hydrogen, alkyl, aryl, fluoroalkyl, or perfluoroalkyl; and b is an integer from 3 to about 8. In some specific embodiments, all of the $R_g$ and $R_h$ groups are alkyl. In more specific embodiments, they are all alkyl of the same length (i.e. same number of carbon atoms).

Exemplary compounds of Formula (3) include octamethylcyclotetrasiloxane (aka D4), decamethylcyclopentasiloxane (aka D5), dodecamethylcyclohexasiloxane (aka D6), and 1,3,5-tris[(3,3,3-trifluoropropyl)methyl]cyclotrisiloxane (aka D3F) which are illustrated below as Formulas (3-a), (3-b), (3-c), and (3-d) respectively:

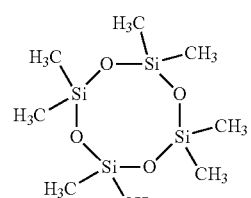

Formula (3-a)

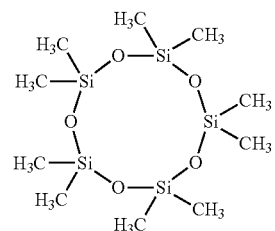

Formula (3-b)

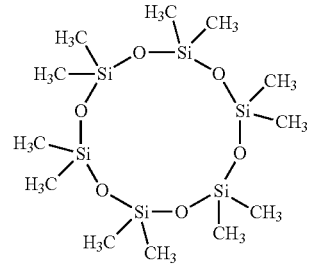

Formula (3-c)

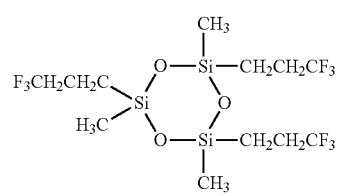

Formula (3-d)

Other compounds of Formula (3) include hexamethylcyclotrisiloxane (D3) and 1,3,5,7-tetrakis(3,3,3-trifluoropropyl)-1,3,5,7-tetramethylcyclotetrasiloxane (D4F).

In particular embodiments, the release oil has a viscosity of 200 centipoise or less and has a boiling point of 150° C. or greater. In more specific embodiments, the release oil has a viscosity of 200 centipoise or less and has a boiling point of 200° C. or greater. Although viscosity data for D3, D3F, and D4F are not available, they are expected to be below 100 centipoise because their apparent viscosities are much lower than silicone oils having viscosities of around 100 centipoise. The following table contains some information relating to compounds of Formula (3):

| Compound | CAS # | MW | Boiling point (° C.) | Viscosity (25° C., centipoise) | Density (25° C., g/cm$^3$) |
|---|---|---|---|---|---|
| D3 | 541-05-9 | 222.46 | 134 | Solid mp = 65° C. | 1.02 |
| D4 | 556-67-2 | 296.61 | 172-175 | 2.2 | 0.95 |
| D5 | 541-02-6 | 370.77 | 210-211 | 3.5-4 | 0.954 |
| D6 | 540-97-6 | 444.92 | 245 | 6.6 | 0.963 |
| D3F | 2374-14-3 | 468.54 | 239-253 | Solid mp = 34° C. | 1.23 |
| D4F | 429-67-4 | 624.73 | 288 | | 1.273 |

Lower molecular weight oils can be used with digital offset printing because the transfer temperatures are near room temperature, and so outgassing or vaporization will not occur. The non-reactivity of these oils also permits them to be directly infused into the elastomer before curing without impeding the subsequent curing. Such oils can also diffuse to the surface of the layer with much higher speed (microsecond time scales). For example, D4, D5, or D6 can be used as the release oil for silicone elastomers without impeding their cure. D3F can be used with fluorosilicone elastomers without impeding their cure either.

When ink is initially applied to the surface layer, the ink is able to adhere to the elastomer. Then, during transfer, the release oil is released due to pressure applied at the nip. A weak boundary layer film (typically around 10 nm thick) is formed between the surface layer and the ink which is deposited upon the surface layer of the imaging member. This aids in complete transfer of the ink from the imaging member to the receiving substrate (e.g. paper). The low molecular weight release oil allows for a lower viscosity boundary layer that promotes cleaner splitting. It should be noted that desirably, the imaging member surface layer has a low tendency to be penetrated by liquids other than the release oil. For example, the ink itself may contain a solvent, and the surface layer desirably resists penetration by such solvents.

The release oil is usually present in an amount of from about 1 to about 20 weight percent of the surface layer. The elastomer may make up from about 80 to about 99 weight percent of the surface layer.

If desired, the silicone rubber may also be loaded with an infrared-absorbing filler that increases energy absorption. This aids in efficient evaporation of the fountain solution. In particular, it is contemplated that the energy is infra-red (IR) energy. In specific embodiments, the metal oxide filler is iron oxide (FeO). Other infrared-absorbing fillers include, but are not limited to, carbon black, graphene, graphite, carbon nanotubes, and carbon fibers. The metal oxide filler may have an average particle size of from about 2 nanometers to about 10 microns. The infrared-absorbing filler may make up from about 5 to about 20 weight percent of the surface layer, including from about 7 to about 15 weight percent.

If desired, the surface layer may also include other fillers, such as silica. Silica can help increase the tensile strength of the surface layer and increase wear resistance. Silica may be present in an amount of from about 2 to about 30 weight percent of the surface layer, including from about 5 to about 30 weight percent.

The surface layer may have a thickness of from about 0.5 microns (μm) to about 4 millimeters (mm), depending on the requirements of the overall printing system. It is contemplated that the surface layer is generally homogeneous, though this will change as the surface layer is used and the release oil is consumed during printing.

Methods of fabricating the imaging member surface layer are also disclosed. The methods may include depositing a surface layer composition upon a mold; and curing the surface layer composition. The surface layer composition includes at a minimum the swellable elastomer. The surface layer composition may further comprise infrared absorbing filler, silica, a release oil, and/or a catalyst. The release oil may be added into the initial surface layer composition or physically absorbed through the surface by wiping or soaking the partially cured or completely cured elastomer layer with the release oil. The curing may be performed at room temperature or at a temperature lower than the boiling point of the release oil.

Further disclosed are processes for variable lithographic printing. The processes include applying a fountain solution/dampening fluid to an imaging member comprising an imaging member surface. A latent image is formed by evaporating the fountain solution from selective locations on the imaging member surface to form hydrophobic non-image areas and hydrophilic image areas; developing the latent image by applying an ink composition to the hydrophilic image areas; and transferring the developed latent image to a receiving substrate with the application of nip pressure. The imaging member surface comprises a swellable elastomer doped with a release oil. The nip pressure results in a layer of the release oil being formed between the surface layer and the developed image to enhance transfer efficiency.

FIG. 2 is a schematic that illustrates this process. Step A shows the imaging member surface layer 210 located upon a substrate 220. The surface layer includes outer surface 212. Step B shows the surface after ink 230 has been applied to an image area, and also shows a non-image area. In Step C, pressure is being applied to the surface layer. This causes the release oil to be "squeezed" from the surface layer 210 to form a boundary layer 240 between the outer surface 212 and the ink 230. This allows the ink to be more easily and completely transferred to the receiving substrate (not shown).

The present disclosure contemplates a system where the dampening fluid is hydrophobic (i.e. non-aqueous) and the ink somewhat hydrophilic (having a small polar component). This system can be used with the imaging member surface layer of the present disclosure. Generally speaking, the variable lithographic system can be described as comprising an ink composition, a dampening fluid, and an imaging member surface layer, wherein the dampening fluid has a surface energy alpha-beta coordinate which is within the circle connecting the alpha-beta coordinates for the surface energy of the ink and the surface energy of the imaging member surface layer. In particular embodiments, the dampening fluid has a total surface tension greater than 10 dynes/cm and less than 75 dynes/cm with a polar component of less than 50 dynes/cm. In some more specific embodiments, the dampening fluid has a total surface tension greater than 15 dynes/cm and less than 30 dynes/cm with a polar component of less than 5 dynes/cm. The imaging member surface layer may have a surface tension of less than 30 dynes/cm with a polar component of less than 2 dynes/cm.

By choosing the proper chemistry, it is possible to devise a system where both the ink and the dampening fluid will wet the imaging member surface, but the ink and the dampening fluid will not mutually wet each other. The system can also be designed so that it is energetically favorable for dampening fluid in the presence of ink residue to actually lift the ink residue off of the imaging member surface by having a higher affinity for wetting the surface in the presence of the ink. In other words, the dampening fluid could remove microscopic background defects (e.g. <1 μm radius) from propagating in subsequent prints.

The dampening fluid should have a slight positive spreading coefficient so that the dampening fluid wets the imaging member surface. The dampening fluid should also maintain a spreading coefficient in the presence of ink, or in other words the dampening fluid has a closer surface energy value to the imaging member surface than the ink does. This causes the imaging member surface to value wetting by the dampening fluid compared to the ink, and permits the dampening fluid to lift off any ink residue and reject ink from adhering to the surface where the laser has not removed dampening fluid. Next, the ink should wet the imaging member surface in air with a roughness enhancement factor (i.e. when no dampening fluid is present on the surface). It should be noted that the surface may have a roughness of less than 1 μm when the ink is applied at a thickness of 1 to 2 μm. Desirably, the dampening fluid does not wet the ink in the presence of air. In other words, fracture at the exit inking nip should occur where the ink and the dampening fluid interface, not within the dampening fluid itself. This way, dampening fluid will not tend to remain on the imaging member surface after ink has been transferred to a receiving substrate. Finally, it is also desirable that the ink and dampening fluid are chemically immiscible such that only emulsified mixtures can exist. Though the ink and the dampening fluid may have alpha-beta coordinates close together, often choosing the chemistry components with different levels of hydrogen bonding can reduce miscibility by increasing the difference in the Hanson solubility parameters.

The role of the dampening fluid is to provide selectivity in the imaging and transfer of ink to the receiving substrate. When an ink donor roll in the ink source of FIG. 1 contacts the dampening fluid layer, ink is only applied to areas on the imaging member that are dry, i.e. not covered with dampening fluid.

It is contemplated that the dampening fluid which is compatible with the ink compositions of the present disclosure is a volatile hydrofluoroether (HFE) liquid or a volatile silicone liquid. These classes of fluids provides advantages in the amount of energy needed to evaporate, desirable characteristics in the dispersive/polar surface tension design space, and the additional benefit of zero residue left behind once evaporated. The hydrofluoroether and silicone are liquids at room temperature, i.e. 25° C.

In specific embodiments, the volatile hydrofluoroether liquid has the structure of Formula (I):

  Formula (I)

wherein m and n are independently integers from 1 to about 9; and p and q are independently integers from 0 to 19. As can be seen, generally the two groups bound to the oxygen atom are alkyl or fluoroalkyl groups.

In particular embodiments, q is zero and p is non-zero. In these embodiments, the right-hand side of the compound of Formula (I) becomes a perfluoroalkyl group. In other embodiments, q is zero and p has a value of 2 m+1. In these embodiments, the right-hand side of the compound of Formula (I) is a perfluoroalkyl group and the left-hand side of the compound of Formula (I) is an alkyl group. In still other embodiments, both p and q are at least 1.

In particular embodiments, the hydrofluoroether has the structure of any one of Formulas (I-a) through (I-h):

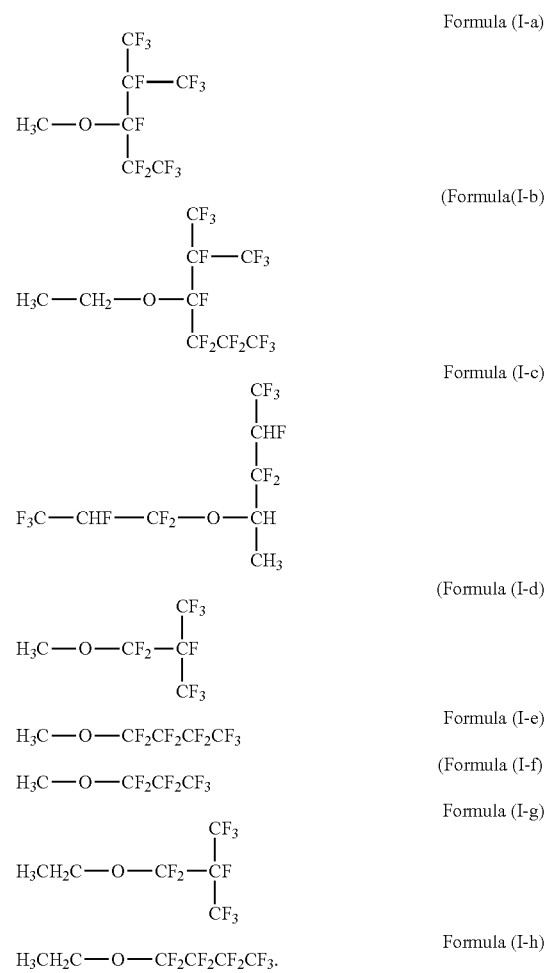

Of these formulas, Formulas (I-a), (I-b), (I-d), (I-e), (I-f), (I-g), and (I-h) have one alkyl group and one perfluoroalkyl group, either branched or linear. In some terminology, they are also called segregated hydrofluoroethers. Formula (I-c) contains two fluoroalkyl groups and is not considered a segregated hydrofluoroether.

Formula (I-a) is also known as 1,1,1,2,2,3,4,5,5,5-decafluoro-3-methoxy-4-(trifluoromethyl)pentane and has CAS#132182-92-4. It is commercially available as Novec™ 7300.

Formula (I-b) is also known as 3-ethoxy-1,1,1,2,3,4,4,5,5,6,6,6-dodecafluoro-2-(trifluoromethyl)hexane and has CAS#297730-93-9. It is commercially available as Novec™ 7500.

Formula (I-c) is also known as 1,1,1,2,3,3-Hexafluoro-4-(1,1,2,3,3,3-hexafluoropropoxy)pentane and has CAS#870778-34-0. It is commercially available as Novec™ 7600.

Formula (I-d) is also known as methyl nonafluoroisobutyl ether and has CAS#163702-08-7. Formula (I-e) is also known as methyl nonafluorobutyl ether and has CAS#163702-07-6. A mixture of Formulas (I-d) and (I-e) is commercially available as Novec™ 7100. These two isomers are inseparable and have essentially identical properties.

Formula (I-f) is also known as 1-methoxyheptafluoropropane or methyl perfluoropropyl ether, and has CAS#375-03-1. It is commercially available as Novec™ 7000.

Formula (I-g) is also known as ethyl nonafluoroisobutyl ether and has CAS#163702-05-4. Formula (I-h) is also known as ethyl nonafluorobutyl ether and has CAS#163702-06-5. A mixture of Formulas (I-g) and (I-h) is commercially available as Novec™ 7200 or Novec™ 8200. These two isomers are inseparable and have essentially identical properties.

It is also possible that similar compounds having a cyclic aromatic backbone with perfluoroalkyl sidechains can be used. In particular, compounds of Formula (A) are contemplated:

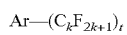

Formula (A)

wherein Ar is an aryl or heteroaryl group; k is an integer from 1 to about 9; and t indicates the number of perfluoroalkyl sidechains, t being from 1 to about 8.

The term "heteroaryl" refers to a cyclic radical composed of carbon atoms, hydrogen atoms, and a heteroatom within a ring of the radical, the cyclic radical being aromatic. The heteroatom may be nitrogen, sulfur, or oxygen. Exemplary heteroaryl groups include thienyl, pyridinyl, and quinolinyl. When heteroaryl is described in connection with a numerical range of carbon atoms, it should not be construed as including substituted heteroaromatic radicals. Note that heteroaryl groups are not a subset of aryl groups.

Hexafluoro-m-xylene (HFMX) and hexafluoro-p-xylene (HFPX) are specifically contemplated as being useful compounds of Formula (A) that can be used as low-cost dampening fluids. HFMX and HFPX are illustrated below as Formulas (A-a) and (A-b):

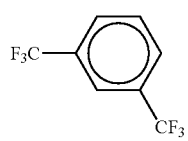

Formula (A-a)

Formula (A-b)

It should be noted any co-solvent combination of fluorinated damping fluids can be used to help suppress non-desirable characteristics such as a low flammability temperature.

Alternatively, the dampening fluid solvent is a volatile silicone liquid. In some embodiments, the volatile silicone liquid is a linear siloxane having the structure of Formula (II):

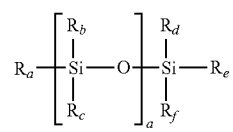

Formula (II)

wherein $R_a$, $R_b$, $R_c$, $R_d$, $R_e$, and $R_f$ are each independently hydrogen, alkyl, or perfluoroalkyl; and a is an integer from 1 to about 5. In some specific embodiments, $R_a$, $R_b$, $R_c$, $R_d$, $R_e$, and $R_f$ are all alkyl. In more specific embodiments, they are all alkyl of the same length (i.e. same number of carbon atoms).

Exemplary compounds of Formula (II) include hexamethyldisiloxane and octamethyltrisiloxane, which are illustrated below as Formulas (II-a) and (II-b):

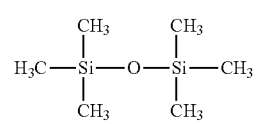

Formula (II-a)

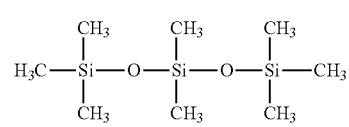

Formula (II-b)

In other embodiments, the volatile silicone liquid is a cyclosiloxane having the structure of Formula (III):

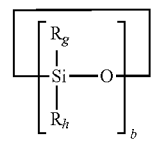

Formula (III)

wherein each $R_g$ and $R_h$ is independently hydrogen, alkyl, or perfluoroalkyl; and b is an integer from 3 to about 8. In some specific embodiments, all of the $R_g$ and $R_h$ groups are alkyl. In more specific embodiments, they are all alkyl of the same length (i.e. same number of carbon atoms).

Exemplary compounds of Formula (III) include octamethylcyclotetrasiloxane (aka D4) and decamethylcyclopentasiloxane (aka D5), which are illustrated below as Formulas (III-a) and (III-b):

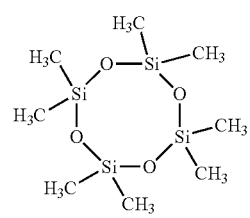

Formula (III-a)

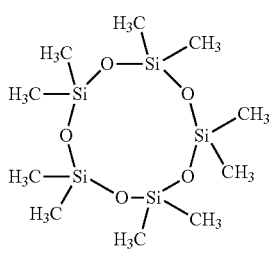
Formula (III-b)

In other embodiments, the volatile silicone liquid is a branched siloxane having the structure of Formula (IV):

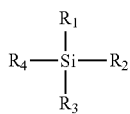
Formula (IV)

wherein $R_1$, $R_2$, $R_3$, and $R_4$ are independently alkyl or $-OSiR_1R_2R_3$.

An exemplary compound of Formula (IV) is methyl trimethicone, also known as methyltris(trimethylsiloxy)silane, which is commercially available as TMF-1.5 from Shin-Etsu, and shown below with the structure of Formula (IV-a):

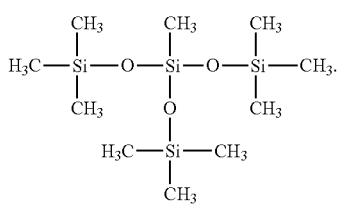
Formula (IV-a)

Any of the above described hydrofluoroethers/perfluorinated compounds are miscible with each other. Any of the above described silicones are also miscible with each other. This allows for the tuning of the dampening fluid for optimal print performance or other characteristics, such as boiling point or flammability temperature. Combinations of these hydrofluoroether and silicone liquids are specifically contemplated as being within the scope of the present disclosure. It should also be noted that the silicones of Formulas (II), (III), and (IV) are not considered to be polymers, but rather discrete compounds whose exact formula can be known.

In particular embodiments, it is contemplated that the dampening fluid comprises a mixture of octamethylcyclotetrasiloxane (D4) and decamethylcyclopentasiloxane (D5). Most silicones are derived from D4 and D5, which are produced by the hydrolysis of the chlorosilanes produced in the Rochow process. The ratio of D4 to D5 that is distilled from the hydrolysate reaction is generally about 85% D4 to 15% D5 by weight, and this combination is an azeotrope.

In particular embodiments, it is contemplated that the dampening fluid comprises a mixture of octamethylcyclotetrasiloxane (D4) and hexamethylcyclotrisiloxane (D3), the D3 being present in an amount of up to 30% by total weight of the D3 and the D4. The effect of this mixture is to lower the effective boiling point for a thin layer of dampening fluid.

These volatile hydrofluoroether liquids and volatile silicone liquids have a low heat of vaporization, low surface tension, and good kinematic viscosity.

The ink compositions contemplated for use with the present disclosure generally include a colorant and a plurality of selected curable compounds. The curable compounds can be cured under ultraviolet (UV) light to fix the ink in place on the final receiving substrate. As used herein, the term "colorant" includes pigments, dyes, quantum dots, mixtures thereof, and the like. Dyes and pigments have specific advantages. Dyes have good solubility and dispersibility within the ink vehicle. Pigments have excellent thermal and light-fast performance. The colorant is present in the ink composition in any desired amount, and is typically present in an amount of from about 10 to about 40 weight percent (wt %), based on the total weight of the ink composition, or from about 20 to about 30 wt %. Various pigments and dyes are known in the art, and are commercially available from suppliers such as Clariant, BASF, and Ciba, to name just a few.

The ink compositions may have a viscosity of from about 5,000 to about 300,000 centipoise at 25° C. and a shear rate of 5 $sec^{-1}$, including a viscosity of from about 15,000 to about 250,000 cps. The ink compositions may have a viscosity of from about 2,000 to about 90,000 centipoise at 25° C. and a shear rate of 50 $sec^{-1}$, including a viscosity of from about 5,000 to about 65,000 cps. The shear thinning index, or SHI, is defined in the present disclosure as the ratio of the viscosity of the ink composition at two different shear rates, here 50 $sec^{-1}$ and 5 $sec^{-1}$. This may be abbreviated as SHI (50/5). The SHI (50/5) may be from about 0.10 to about 0.60 for the ink compositions of the present disclosure, including from about 0.35 to about 0.55. These ink compositions may also have a surface tension of at least about 25 dynes/cm at 25° C., including from about 25 dynes/cm to about 40 dynes/cm at 25° C. These ink compositions possess many desirable physical and chemical properties. They are compatible with the materials with which they will come into contact, such as the dampening fluid, the surface layer of the imaging member, and the final receiving substrate. They also have the requisite wetting and transfer properties. They can be UV-cured and fixed in place. They also have a good viscosity; conventional offset inks usually have a viscosity above 50,000 cps, which is too high to use with nozzle-based inkjet technology. In addition, one of the most difficult issues to overcome is the need for cleaning and waste handling between successive digital images to allow for digital imaging without ghosting of previous images. These inks are designed to enable very high transfer efficiency instead of ink splitting, thus overcoming many of the problems associated with cleaning and waste handling. The ink compositions of the present disclosure do not gel, whereas regular offset inks made by simple blending do gel and cannot be used due to phase separation.

EXAMPLES

Example 1

A series of fluorosilicone samples containing various release oils were prepared as shown in following Table 1. The general procedure for their preparation is described below as for the preparation of sample 1. A carbon dispersion was first prepared by adding Cabot Vulcan XC72 carbon black (5 g), trifluorotoluene (100 g), and stainless steel balls (50 g) into a 250 ml polypropylene bottle. The resulting mixture was shaken at high speed overnight using a Burrell Wrist-Action® shaker. NuSil FS-3502-1A (4.5 g), Halo Carbon 27 (0.6 g), trifluorotoluene (6.0 g), and platinum catalyst (80 microliter, Gelest SIP6831.2 having pt concentration of 2.1-2.4%) was added to a 60 ml polypropylene bottle. The mixture was shaken for at least 30 min before adding the carbon black dispersion (12.0 g), and the resulting mixture was shaken for another 10 min. Nusil hydrofluorosilicone XL150 (0.5 g) was added, all at once, and the resulting mixture was shaken for 10 min and then poured into two polypropylene dishes, each having a diameter of about 2 inches. The mixture was allowed to cure at room temperature overnight to give fluorosilicone sample 1. The other samples were prepared in a similar fashion. Except for Halocarbon 27 which is from Halocarbon Products Corporation, all the other silicone oils were from Gelest. DMS-T21 is a polydimethylsiloxane oil, PMM-5021 is a phenylmethylsiloxane oil, FMS-121, -123, -131, and -141 are fluorosilicone oils, and FMS-221 is a 50/50 silicone and fluorosilicone copolymer.

All the samples were characterized by a deinking test, which involve rolling commercial offset printing ink onto the samples following by contact transfer onto blank sheet of paper. Ink transfer of greater than 90% in less than 2 transfers is given a rating of excellent, in less than 4 transfers is given a good rating, in less than 6 transfers is given a fair rating, and then a poor rating. The fact that samples 5 and 6 show the best deinking performance indicated that low molecular weight fluorosilicone oils are the best release oil candidates.

mixture was shaken at high speed overnight using a Burrell Wrist-Action® shaker. NuSil FS-3502-1A (4.5 g), D3F (0.75 g), and platinum catalyst (70 microliter, Gelest SIP6831.2 having pt concentration of 2.1-2.4%) was added into a 60 ml polypropylene bottle. The mixture was shaken for 30 min before adding the carbon black dispersion (14.0 g), and the resulting mixture was shaken for another 10 min. A solution of Nusil hydrofluorosilicone XL150 (1.0 g) and trifluorotoluene (4.0 g) was added, all at once, and the resulting mixture was shaken for 10 min and then poured into two polypropylene dishes, each having a diameter of about 2 inches. The mixture was allowed to cure at room temperature overnight, and then at 165° C. for 6 h to yield a fluorosilicone sample that showed close to quantitative deinking in one pass. This result indicates again that lowest molecular weight fluorosilicone oils are the best release oil candidates because D3F has a relatively low molecular weight.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A offset lithographic imaging member comprising a reimageable surface layer surrounding and in contact with a

TABLE 1

| | 1 | 2 | 3 | 4 | 5 | 6 | 7 | 8 | 9 |
|---|---|---|---|---|---|---|---|---|---|
| NuSil Fluorosilicone type | FS-3502-1A | FS-3502-1A | FS-3502-1A | FS-3502-1A | FS-3502-1A | FS-3502-1A | FS-3502-1A | FS-3502-1A | FS-3502-1A |
| NuSil Fluorosilicone (g) | 4.50 | 4.80 | 4.50 | 4.50 | 4.50 | 4.50 | 4.50 | 4.50 | 4.53 |
| Oil product name | Halocarbon 27 | Halocarbon 27 | DMS-T21 | PMM-5021 | FMS-121 | FMS-123 | FMS-221 | FMS-131 | FMS-141 |
| Oil viscosity@25° C. (cSt) | 50 | 50 | 100 | 125 | 80-120 | 300-350 | 80-120 | 1000 | 10000 |
| Oil weight (g) | 0.60 | 0.70 | 0.60 | 0.60 | 0.60 | 0.60 | 0.60 | 0.60 | 0.60 |
| trifluorotoluene (g) | 6.00 | 7.00 | 6.00 | 6.00 | 6.00 | 6.00 | 6.00 | 6.00 | 6.00 |
| Pt catalyst (uL) | 80.00 | 70.00 | 80.00 | 80.00 | 80.00 | 80.00 | 80.00 | 80.00 | 80.00 |
| Dispersion of Cabot Vulcan XC72 carbon black (5 g) in trifluorotoluene (100 g) | 12.00 | 13.00 | 14.50 | 14.50 | 14.50 | 14.50 | 14.50 | 14.50 | 14.50 |
| NuSil XL150 (g) | 0.50 | 1.20 | 1.00 | 1.00 | 1.00 | 1.00 | 1.00 | 1.00 | 1.00 |
| Total Wt | 23.60 | 26.70 | 26.60 | 26.60 | 26.60 | 26.60 | 26.60 | 26.60 | 26.63 |
| Solid Wt | 5.67 | 6.12 | 6.79 | 6.79 | 6.79 | 6.79 | 6.79 | 6.79 | 6.82 |
| solvent WT | 17.93 | 20.58 | 19.81 | 19.81 | 17.93 | 17.93 | 17.93 | 19.81 | 19.81 |
| solvent/solid wt ratio | 3.16 | 3.36 | 2.92 | 2.92 | 2.64 | 2.64 | 2.64 | 2.92 | 2.90 |
| C % | 10.08 | 10.12 | 10.17 | 10.17 | 10.17 | 10.17 | 10.17 | 10.17 | 10.12 |
| Oil % | 10.58 | 11.44 | 8.84 | 8.84 | 8.84 | 8.84 | 8.84 | 8.84 | 8.80 |
| deinking characteristics | poor | good | poor | fair | excellent | excellent | good | good | fair |

Example 2

This example describes the preparation of a fluorosilicone samples containing D3F as the release oil. A carbon dispersion was first prepared by adding Cabot Vulcan XC72 carbon black (5 g), trifluorotoluene (75 g), and stainless steel balls (50 g) into a 125 ml polypropylene bottle. The resulting substrate, and a liquid boundary layer, the reimageable surface layer having a micro-roughened surface configured to receive, carry, and transfer ink to a receiving substrate and to retain the liquid boundary layer on the micro-roughened surface, the reimageable surface layer cured and comprising a swellable fluorosilicone elastomer having a release oil therein, the fluorosilicone including a polyorganosiloxane having a backbone formed from silicon and oxygen atoms, and sidechains containing carbon, hydrogen, and fluorine atoms, the liquid boundary layer on the micro-roughened surface of the reimageable surface layer including a portion of the release oil, wherein the surface layer is configured to transfer the portion of the release oil to the liquid boundary layer.

2. The imaging member of claim 1, wherein the release oil has a viscosity of 200 centipoise or less and has a boiling point of 150° C. or greater.

3. The imaging member of claim 1, wherein the release oil is hexamethylcyclotrisiloxane (D3), octamethylcyclotetrasiloxane (D4).

4. The imaging member of claim 1, wherein the release oil has a viscosity of 1000 centipoise or less.

5. The imaging member of claim 1, wherein the release oil is from 1 to 20 weight percent of the surface layer.

6. The imaging member of claim 1, wherein the boundary layer located in direct contact with the outer surface of the surface layer is formed of the release oil.

7. The imaging member of claim 1, wherein the release oil is hexamethylcyclotrisiloxane (D3), octamethylcyclotetrasiloxane (D4), decamethylcyclopentasiloxane (D5), or dodecamethylcyclohexasiloxane (D6).

8. The imaging member of claim 1, wherein the release oil is 1,3,5-tris[(3,3,3-trifluoropropyl)methyl]cyclotrisiloxane (D3F) or 1,3,5,7-tetrakis(3,3,3-trifluoropropyl)-1,3,5,7-tetramethylcyclotetrasiloxane (D4F).

9. The imaging member of claim 1, wherein the fluorosilicone includes an amino functional group configured to permit crosslinking.

10. The imaging member of claim 1, wherein the boundary layer located in direct contact with the outer surface of the surface layer and the ink is formed of the release oil and is 10 nm thick.

11. The imaging member of claim 1, wherein the reimageable surface layer is the only layer between the substrate and the liquid boundary layer.

* * * * *